(12) United States Patent
Brandt

(10) Patent No.: US 8,118,143 B2
(45) Date of Patent: Feb. 21, 2012

(54) CENTRIFUGAL EMERGENCY BRAKE

(76) Inventor: Axel Brandt, Clinton Township, MI (US)

( * ) Notice: Subject to any disclaimer, the term of this patent is extended or adjusted under 35 U.S.C. 154(b) by 1118 days.

(21) Appl. No.: 11/947,220

(22) Filed: Nov. 29, 2007

(65) Prior Publication Data

US 2009/0139806 A1    Jun. 4, 2009

(51) Int. Cl.
*F16D 59/00* (2006.01)
(52) U.S. Cl. .................. 188/184; 188/71.2; 192/105 BB
(58) Field of Classification Search .............. 188/181 A,
188/181 T, 184, 185, 187, 189, 72.7, 72.8,
188/31, 60, 69, 72.1; 92/18 R, 105 BB, 103 A,
92/103 B, 71
See application file for complete search history.

(56) References Cited

U.S. PATENT DOCUMENTS

| | | | | |
|---|---|---|---|---|
| 2,134,316 A * | 10/1938 | Rauen et al. | ............. | 192/105 BB |
| 2,182,427 A * | 12/1939 | Dunn | ............. | 475/261 |
| 2,215,690 A * | 9/1940 | Dunn | ............. | 192/105 BB |
| 3,061,052 A | 10/1962 | Hoppe et al. | | |
| 4,095,681 A * | 6/1978 | David | ............. | 188/187 |
| 4,205,737 A * | 6/1980 | Harkness et al. | ............. | 192/17 R |
| 4,216,848 A * | 8/1980 | Shimodaira | ............. | 188/71.2 |
| 4,258,832 A | 3/1981 | Thorp | | |
| 4,282,953 A | 8/1981 | Lichti et al. | | |
| 4,531,617 A * | 7/1985 | Martin et al. | ............. | 187/373 |
| 4,856,623 A | 8/1989 | Romig, Jr. | | |
| 4,913,371 A * | 4/1990 | Margetts | ............. | 242/383.5 |
| 5,222,578 A * | 6/1993 | Thorp | ............. | 187/305 |
| 5,522,581 A | 6/1996 | Kulhavy | | |
| 5,553,832 A | 9/1996 | Zaguroli, Jr. | | |
| 5,697,476 A | 12/1997 | Susmark | | |
| 5,904,229 A * | 5/1999 | Timari | ............. | 188/187 |
| 6,550,597 B2 | 4/2003 | Taniguchi | | |
| 6,578,822 B2 | 6/2003 | Heun et al. | | |
| 6,695,292 B2 | 2/2004 | Nam | | |
| 7,077,246 B2 | 7/2006 | Timtner | | |
| 7,097,156 B2 | 8/2006 | Nam | | |

\* cited by examiner

*Primary Examiner* — Bradley King
*Assistant Examiner* — Nicholas J Lane
(74) *Attorney, Agent, or Firm* — John A. Miller; Miller IP Group, PLC

(57) ABSTRACT

An emergency braking assembly that stops the rotation of a shaft in the event that the speed of the shaft exceeds a predetermined speed. The braking assembly includes a flanged mounting ring that is mounted to a housing where the shaft extends through the ring, and a braking ring threadably mounted to the mounting ring. An insert is mounted to the shaft within the braking ring. The braking assembly insert includes a pair of symmetrical weights that tend to move outward upon rotation of the shaft. Pins mounted to the weights and the insert prevent the weights form moving outward until the speed of the shaft exceeds the predetermined speed. A locking mechanism that locks the pin to the insert releases causing the pins to extend outside of the insert and engage stops mounted to an inside surface of the braking ring, which stops the shaft from rotating.

19 Claims, 7 Drawing Sheets

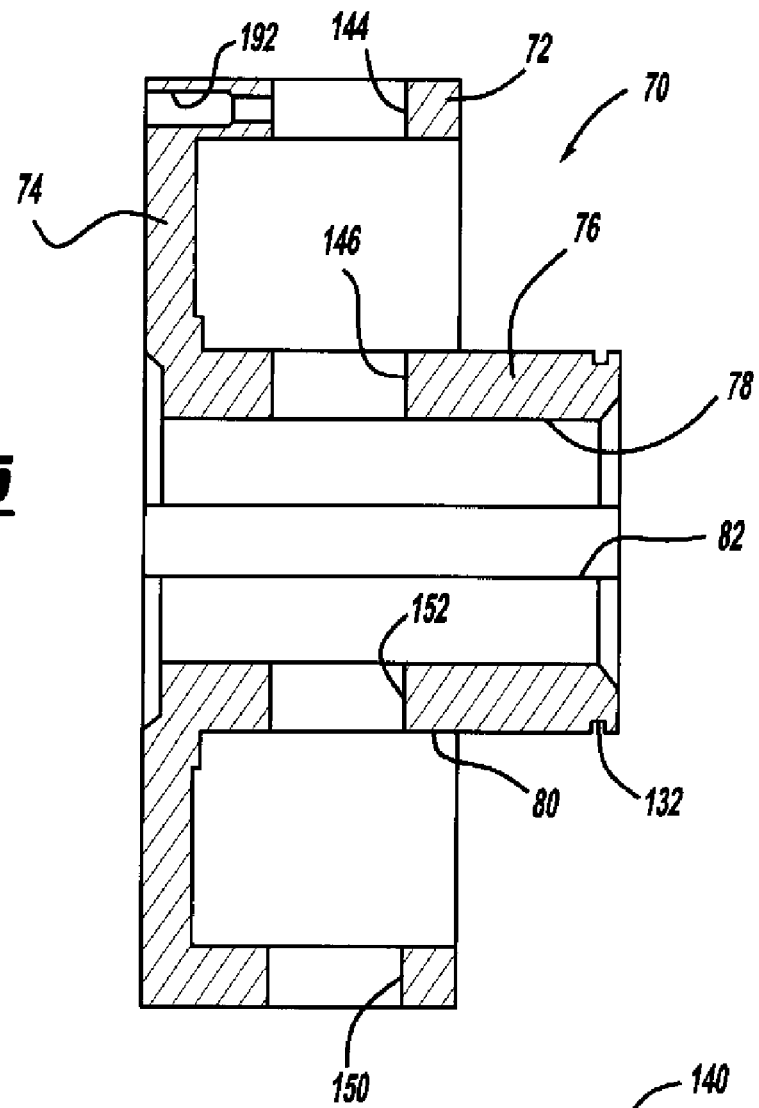
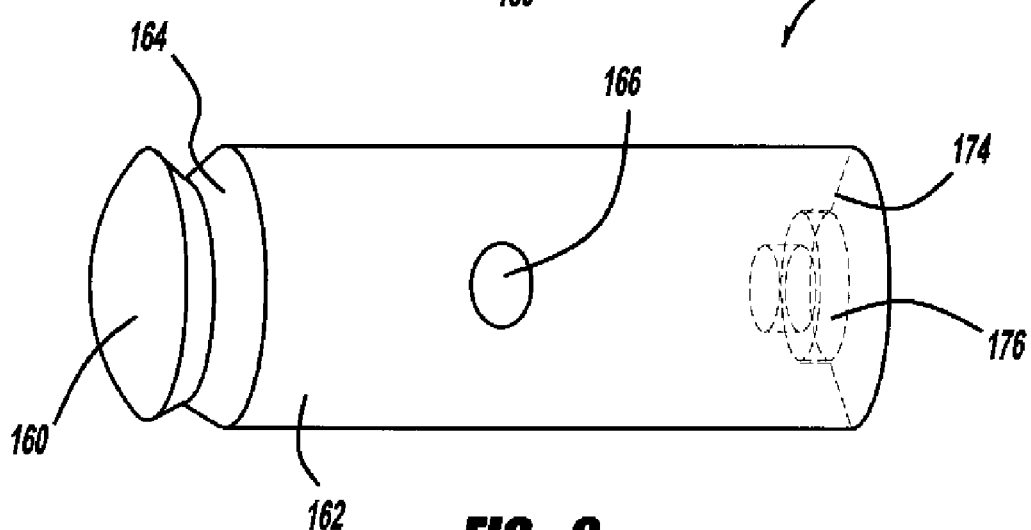

CENTRIFUGAL EMERGENCY BRAKE

BACKGROUND OF THE INVENTION

1. Field of the Invention

This invention relates generally to a braking assembly for stopping the rotation of a shaft and, more particularly, to an emergency braking assembly for stopping the rotation of a shaft if the speed of the shaft exceeds a predetermined speed, where the braking assembly employs weights that slide outward under centrifugal force and cause pins to engage a rotating braking ring.

2. Discussion of the Related Art

Many critical operations in elevating, hoisting, material handling and transfer operations require the use of braking mechanisms to prevent fatalities, injury and damage to property. Typical examples include elevators, man lifts, hoists, locks, conveyers and other machinery designed to overpower gravity, water or wind energy. Failure of these braking mechanisms can lead to a potential runaway condition that can be avoided by the use of redundant braking mechanisms.

Existing systems designed to provide redundant braking are typically powered or released by the same power source that the machine uses, such as electricity, pneumatic pressure or hydraulic pressure. This means that the reliability of these redundant braking systems can only be as reliable as the power source itself.

One application where emergency braking is critical is for overhead hoists and winches. An overhead hoist or winch typically lifts and lowers a load by using a motor that winds and unwinds a cable onto a cylindrical cable drum rotating upon a shaft. The motor includes an output shaft that is coupled to a gear box having an output shaft. The gear box output shaft is coupled to the cable drum shaft so that the gears control the speed and power provided by the motor to the cable drum.

In a typical hoist or winch design, a braking device is attached to the motor. In one design, the braking device includes a spring loaded plate that applies a force against a stationary plate. When the motor shaft is to be rotated, an electrical signal controls an electromagnetic coil that releases the spring loaded plate against the bias of the springs to allow the motor shaft to rotate. Thus, if power is not available to operate the motor, the springs that maintain the motor in the locked position prevent it from rotating.

If the motor brake is not periodically inspected and maintained, contamination and normal wear can affect the ability of the braking device to prevent the motor shaft from rotating. Thus, if the hoist or winch is carrying a load and power is disrupted, the motor brake may not be able to prevent the load from falling. Further, these types of hoists and winches typically do not include a braking device downstream of the motor. Particularly, failure of any of the several gears in the gear box may allow the cable drum shaft to rotate independently of the rotation of the motor shaft. Thus, a potential hazardous condition exists where a gear box failure could cause a suspended load on the hoist or winch to drop, possibly causing injury or worse.

SUMMARY OF THE INVENTION

In accordance with the teachings of the present invention, an emergency braking assembly is disclosed that stops the rotation of a shaft in the event that the speed of the shaft exceeds a predetermined speed. The braking assembly includes a flanged mounting ring that is mounted to a housing where the shaft extends through the ring, and a braking ring threadably mounted to the mounting ring. An insert is mounted to the shaft within the braking ring. The insert includes a pair of symmetrical weights that tend to move outward upon rotation of the shaft. Pins mounted to the weights and the insert prevent the weights form moving outward until the speed of the shaft exceeds the predetermined speed. When the speed of the shaft does reach the predetermined speed, a locking mechanism that locks the pins to the insert releases causing the pins to extend outside of the insert and engage stops mounted to an inside surface of the braking ring. Further rotation of the insert causes the braking ring to rotate on the mounting ring, which stops the shaft from rotating.

Additional features of the present invention will become apparent from the following description and appended claims, taken in conjunction with the accompanying drawings.

BRIEF DESCRIPTION OF THE DRAWINGS

FIG. 5 is a cross-sectional view of an insert within the braking assembly;

FIG. 6 is a perspective view of a braking pin used in the braking assembly;

DETAILED DESCRIPTION OF THE EMBODIMENTS

The following discussion of the embodiments of the invention directed to a braking assembly for stopping the rotation of a shaft is merely exemplary in nature, and is in no way intended to limit the invention or its applications or uses. Particularly, any reference below of the braking assembly of the invention being used for a particular application, such as an overhead hoist or winch, is merely for illustration purposes in that the braking assembly of the invention has application for stopping any suitable shaft.

Figure 1:
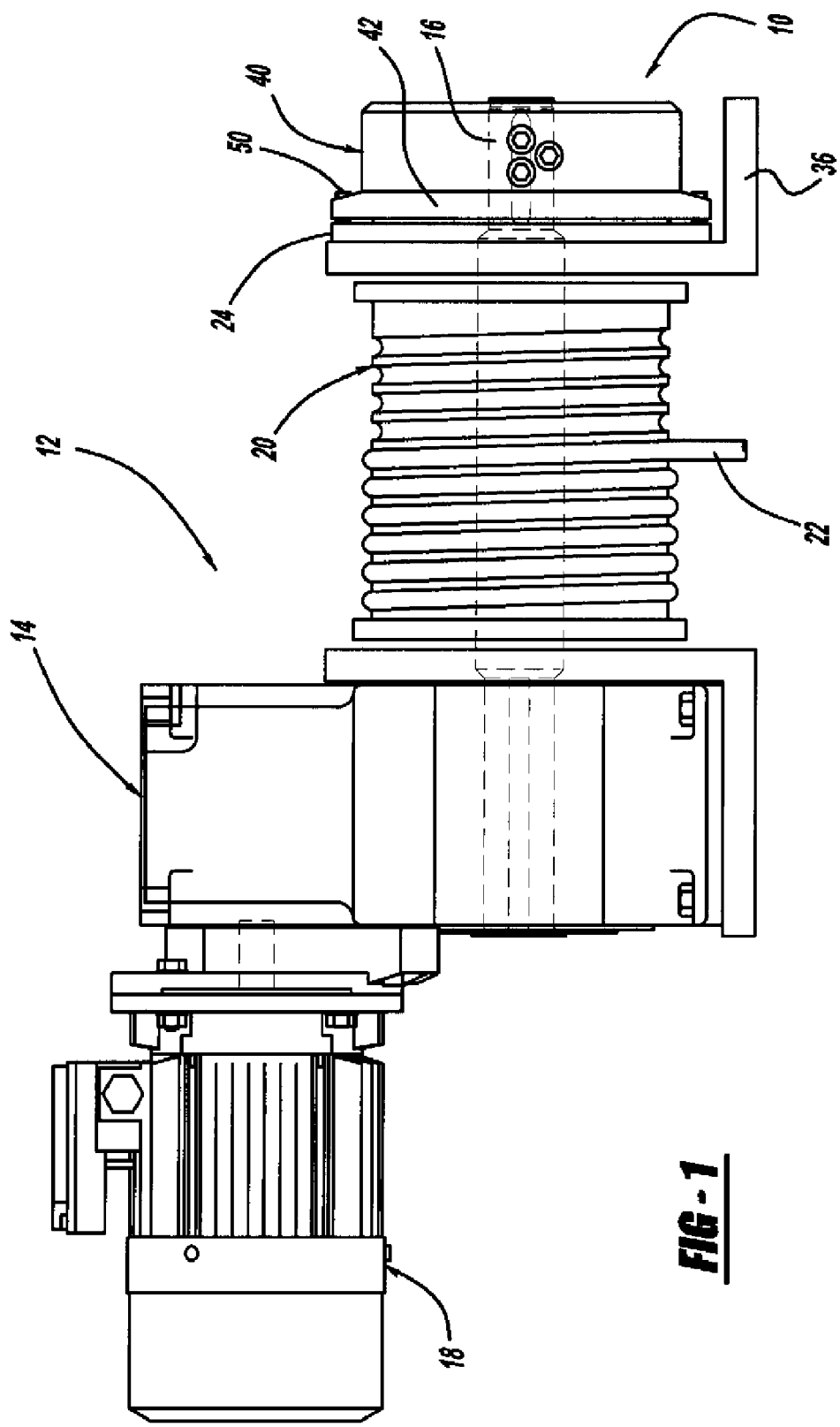
FIG. 1 is a side view of a hoist or winch including a braking assembly, according to an embodiment of the present invention.

FIG. 1 is a side view of an overhead hoist or winch 12 including a braking assembly 10, according to an embodiment of the present invention. The hoist or winch 12 includes a motor 18 that rotates a cable drum 20 including a cable drum shaft 16 through a gear box 14. A cable 22 is wound and unwound onto the cable drum 20 by the motor 18 to lift and lower a load in a manner that is well understood in the art. As discussed above, the motor 18 would include its own braking mechanism that would prevent the motor 18 from rotating in the event of power loss or motor control failure. However, if a failure occurred within the gear box 14, the motor brake controls or the motor 18 itself, then the shaft 16 could continue rotating independent of the braking power of the motor 18. As will be discussed in detail below, the braking assembly 10 engages the shaft 16 if the shaft 16 exceeds a calibrated rotational speed, indicating a failure, to stop the shaft 16 from rotating.

Figure 2:
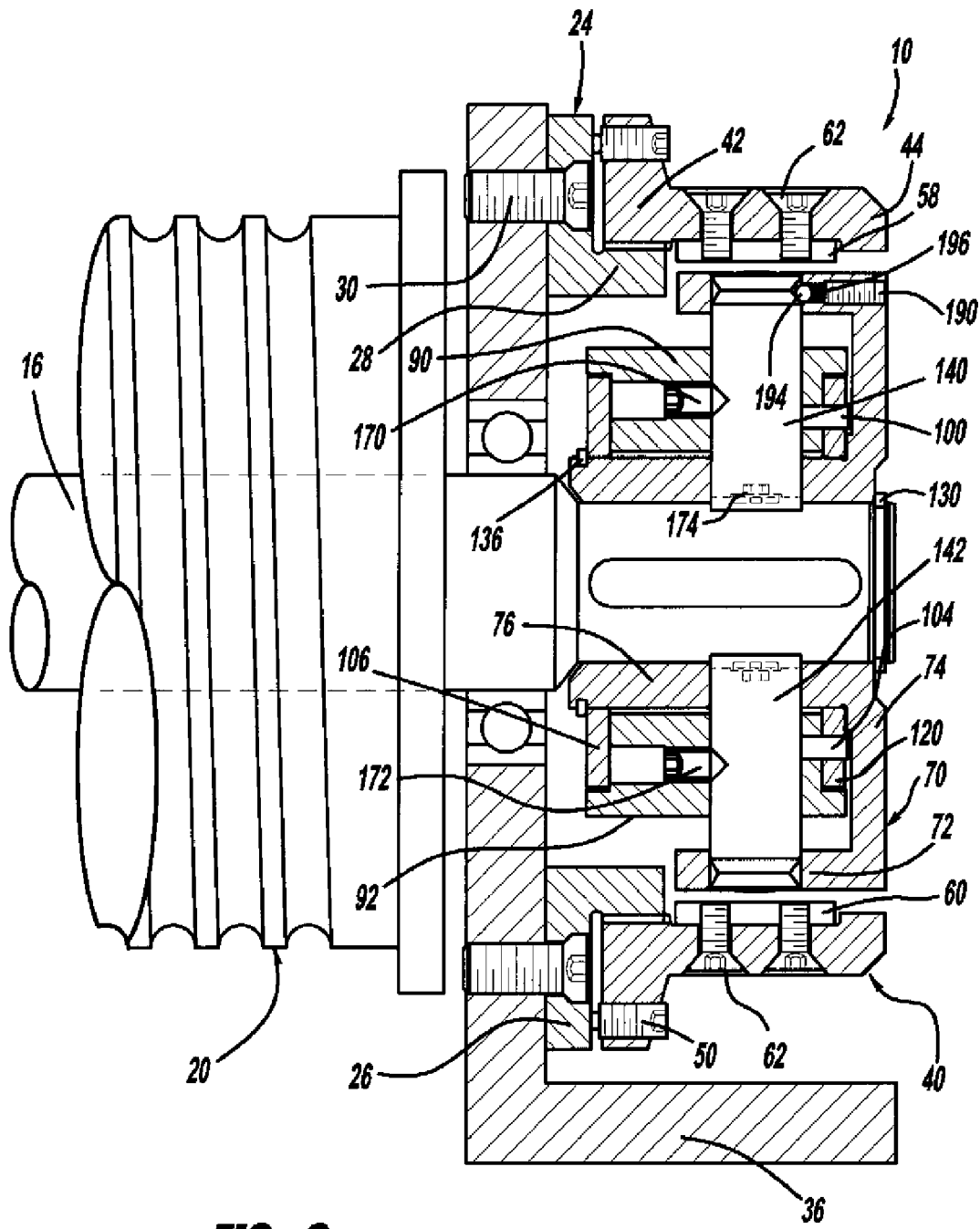
FIG. 2 is a cross-sectional view of the braking assembly shown in FIG. 1.
Figure 3:
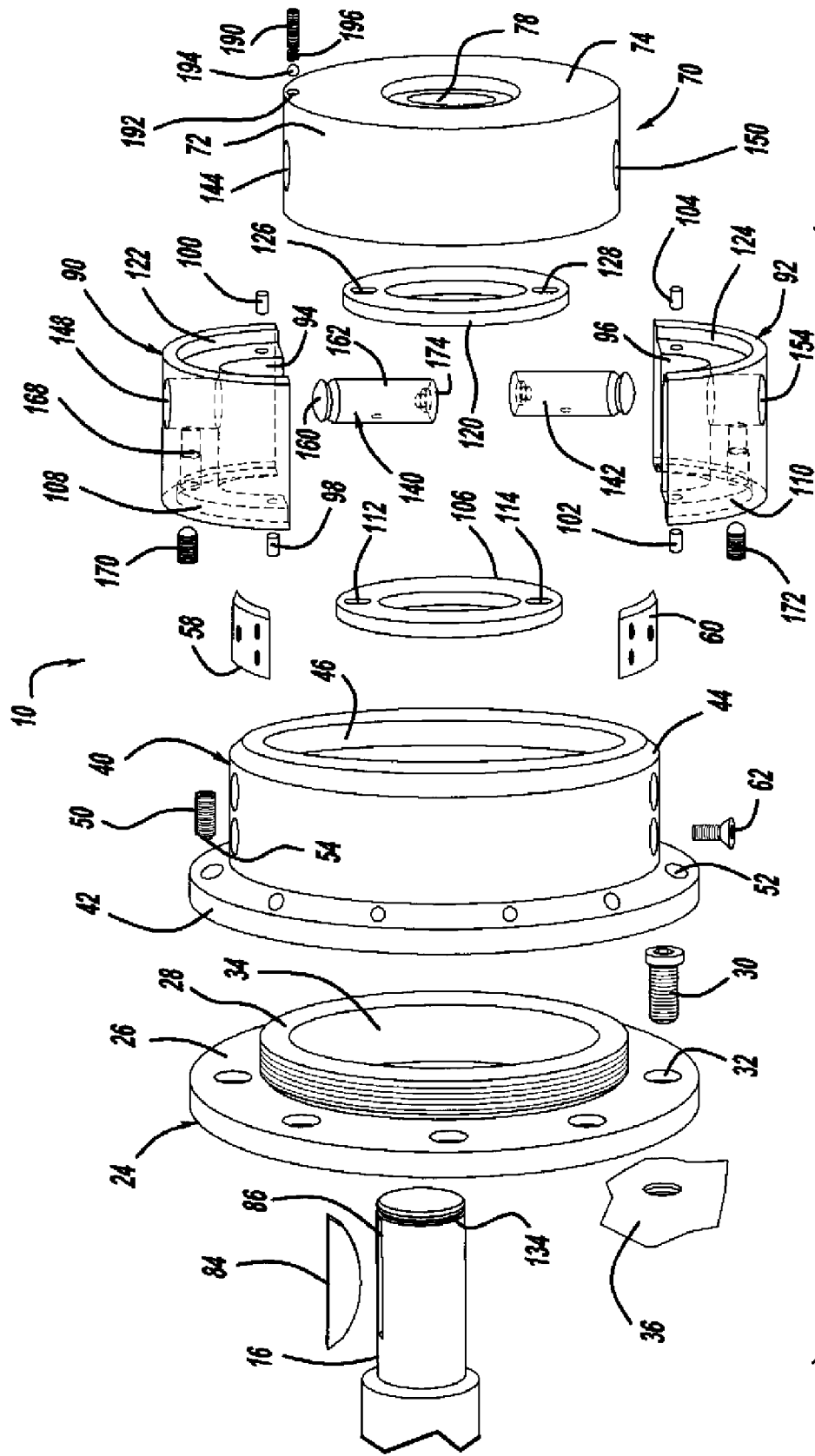
FIG. 3 is a blown-apart perspective view of the braking assembly.
Figure 4:
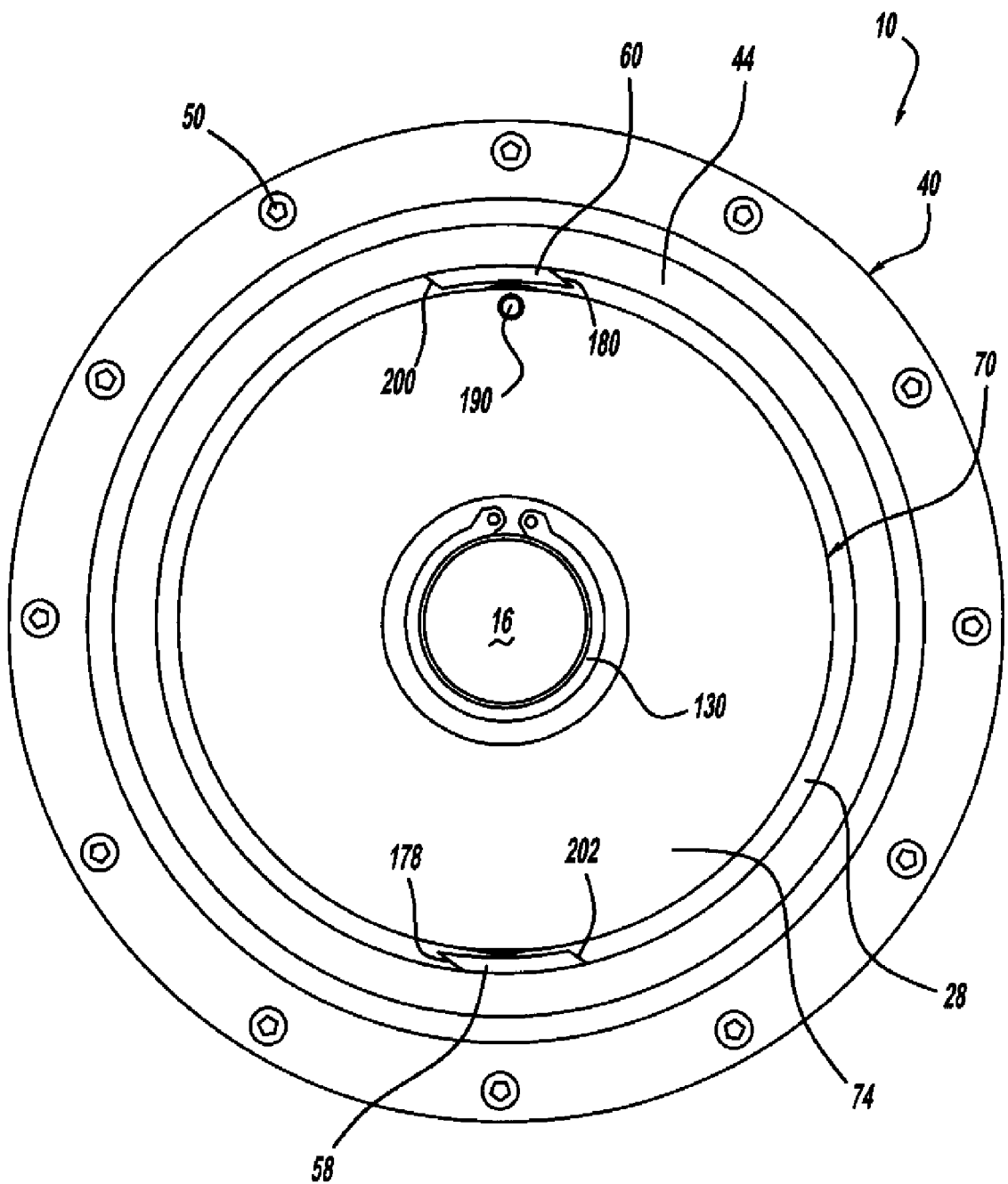
FIG. 4 is a front view of the braking assembly.

FIG. 2 is a cross-sectional view of the braking assembly 10 mounted on the hoist or winch 12, FIG. 3 is a broken-apart perspective view of the braking assembly 10 and FIG. 4 is a front view of the braking assembly 10. The braking assembly 10 includes a mounting ring 24 having a mounting flange 26 and a threaded center cylinder 28 extending therefrom. The mounting ring 24 is bolted to a mounting platform 36 of the hoist or winch 12 by a plurality of bolts 30 theadily engaged through threaded openings 32 in the flange 26. The shaft 16 extends through a central opening 34 in the cylinder 28.

The braking assembly 10 also includes a braking ring 40 having a flange 42 and a center cylinder 44. In this non-limiting embodiment, the braking ring 40 and the mounting ring 24 have about the same diameter. The cylinder 44 includes a cylindrical opening 46 having a threaded portion that theadily engages the outer threads of the cylinder 28 so that the braking ring 40 can rotate on the mounting ring 24. A plurality of pins 50 are threaded through openings 52 in the flange 42 so that a tip 54 of each pin 50 extends out a back of the flange 42 a calibrated distance. When the braking ring 40 is threaded to the mounting ring 24, the tips 54 of the pin 50 will contact an outer surface of the flange 26. For reasons that will become apparent from the discussion below, the pins 50 are made of a softer metal than the mounting ring 24. In one embodiment, the pins 50 are made of brass and the mounting ring 24, as well as most of the components of the braking assembly 10, are made of steel. Opposing brake stops 58 and 60 are mounted within the cylinder 44 by bolts 62 also for reasons that will become apparent from the discussion below.

The braking assembly 10 also includes a cylindrical braking insert 70 that is positioned within the opening 46, and is shown in cross-section in FIG. 5. The braking insert 70 includes a side wall 72, a front plate 74 and a center cylinder 76. A cylindrical bore 78 is provided through the center cylinder 76, and a cylindrical chamber 80 is provided within the insert 70 between the sidewall 72 and the center cylinder 76. The shaft 16 extends through the bore 78 in a suitable fit so that it is able to rotate relative thereto. A key channel 82 is provided within the bore 78 and excepts a half-moon type key 84 that is fitted within a channel 86 in the shaft 16 so that the shaft 16 is locked to the insert 70. Therefore, upon rotation of the shaft 16, the insert 70 will also rotate.

Opposing half-cylindrical weights 90 and 92 are positioned within the chamber 80 in a loose configuration so that the weights 90 and 92 can slide a set distance toward and away form each other within the chamber 80. The weight 90 includes a half-cylindrical opening 94 and the weight 92 includes a half-cylindrical opening 96 that conform to the shape of the center cylinder 76 of the insert 70 so that when the weights 90 and 92 are in a completely retracted position, they are in contact with each other and form a bore through which the center cylinder 76 extends.

The weight 90 includes a pair of control pins 98 and 100 extending from opposite ends, and the weight 92 includes a pair of control pins 102 and 104 extending from opposite ends. A back ring 106 is positioned within channels 108 and 110 in a back-end of the weights 90 and 92 so that the pin 98 is positioned within a slot 112 on the ring 106 and the pin 102 is positioned within a slot 114 on the ring 106. Likewise, a front ring 120 is positioned within a channel 122 in the weight 90 and a channel 124 in the weight 92 so that the pin 100 is positioned within a slot 126 of the ring 120 and the pin 104 is positioned within a slot 128 of the ring 120.

When the weights 90 and 92 are in their retracted position and in contact with each other, the pins 98 and 102 are at one end of the slots 112 and 114, respectively, and the pins 100 and 104 are at one end of the slots 126 and 128, respectively. When the weights 90 and 92 move away from each other under centrifugal force to engage the braking mechanism of the assembly 10, as will be discussed in more detail below, the rings 106 and 120 rotate so that the pin 98 slides in the slot 112, the pin 102 slides in the slot 114, the pin 100 slides in the slot 126 and the pin 104 slides in the slot 128 so that the weights 90 and 92 move in a smooth and symmetrical fashion relative to each other.

A locking ring 136 is positioned within a groove 132 in the center cylinder 76 of the insert 70 to hold the ring 120 within the channels 122 and 124 and the ring 106 within the channels 108 and 110. A locking ring 130 is positioned within a groove 134 in the end of the shaft 16 to hold the assembly 10 on the shaft 16.

Opposing braking pins 140 and 142 are positioned within the insert 70. The braking pin 140 is positioned within the insert 70 so that it extends through a bore 144 of the sidewall 72 of the insert 70, a bore 146 in the center cylinder 76 of the insert 70 and a bore 148 in the weight 90. Likewise, the braking pin 142 extends through a bore 150 in the sidewall 72 of the insert 70, a bore 152 in the center cylinder 76 of the insert 70 and a bore 154 in the weight 92.

FIG. 6 is a perspective view of the pin 140, where the pin 142 is identical. The pin 140 includes a head portion 160 and a body portion 162 defining a V-shaped groove 164 therebetween. A rounded indentation 166 is provided in the body portion 162, and is aligned with a threaded hole 168 in the weight 90. A locking screw 170 is threaded through the hole 168 so that it contacts and is inserted within the indentation 166 so as to lock the pin 140 to the weight 90. A locking screw 172 is also provided to lock the braking pin 142 to the weight 92.

An end of the body portion 162 opposite to the head portion 160 includes a cut-out portion 174 that conforms to the shape of the shaft 16. When the braking pins 140 and 142 are extended to provide the braking, as will be discussed in detail below, the V-shaped groove 164 engages conforming angled edges 178 and 180 on the braking stops 58 and 60, respectively. A resilient bumper 176 is mounted within the indentation 174 by a suitable screw to prevent the pins 140 and 142 from vibrating on the shaft 16 as the assembly 10 rotates.

Figure 7:
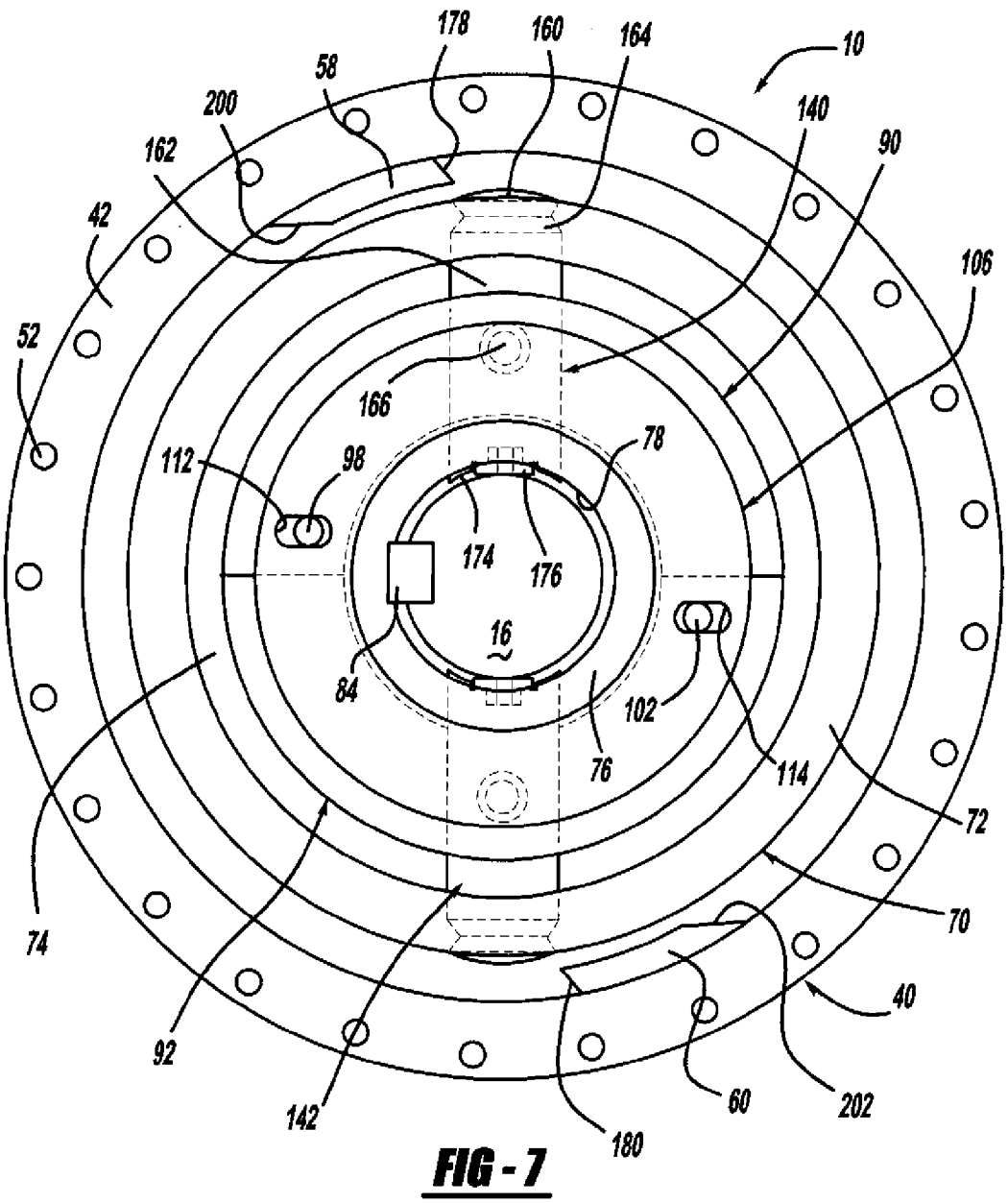
FIG. 7 is a back view of the braking assembly showing the braking pins in a retracted position.

The braking assembly 10 is engaged by the operation of centrifugal force from rotation of the shaft 16. Particularly, once the speed of the shaft 16 exceeds a calibrated speed, where a failure has likely occurred, the weights 90 and 92 slide outward under centrifugal force so that the head portions 160 of the pins 140 and 142 extend out of the sidewall 72 of the insert 70. The calibration speed is set by a calibrating screw 190 that is threaded into an opening 192 in the plate 74 and the side wall 72. First, a ball 194 is placed in the opening 192 and a spring 196 is positioned against the ball 194. The calibrating screw 190 is threaded into the opening 192 the appropriate distance so that the ball 194 is positioned within the V-groove 164 of the pin 140 with the desired force provided by the spring 196. As the shaft 16 rotates at normal speed, the tension provided by the ball 194 in the groove 164 holds the pin 140 in place, which in turn holds the weight 90 in the retracted position. The rings 106 and 120 in turn hold the weight 92 in the retracted position. FIG. 7 is a back view of the braking assembly 10 showing the weights 90 and 92 in the non-braking or retracted position with the mounting ring 24 removed.

Figure 8:
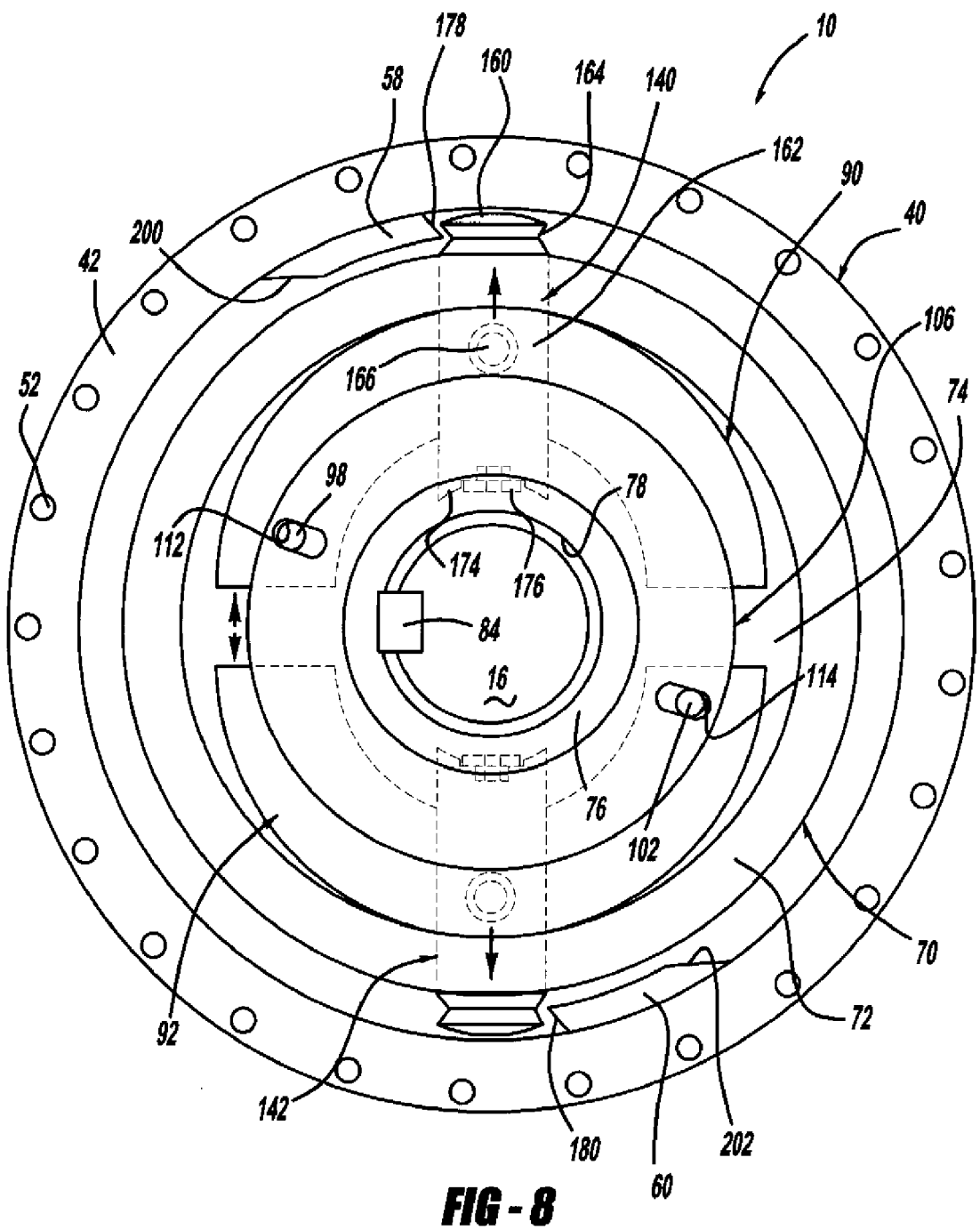
FIG. 8 is a back view of the braking assembly showing the braking pins in an extended braking position.

As the speed of the shaft 16 increases beyond the calibration speed, the groove 164 pushes the ball 194 against the spring 196 so that the ball 194 will be released from the groove 164. The centrifugal force on the weight 90 and 92 will cause the weights 90 and 92 to slide outward in the chamber 80 until they contact the inside edge of the sidewall 72. FIG. 8 is a back view of the braking assembly 10 showing the weights 90 and 92 in the braking or extended position with the mounting ring 24 removed. In this position, the head portions 160 of the pins 140 and 142 extend outward into the inside surface of the cylinder 44.

As the shaft 16 continues to rotate, the head portions 160 and the grooves 164 of the pins 140 and 142 will contact the edges 178 and 180 of the braking stops 58 and 60, respectively, causing the braking ring 40 to rotate with the shaft 16. As the braking ring 40 rotates, it is further threaded onto the mounting ring 24 driving the tips 54 of the pins 50 into the flange 26. Because the tips 54 of the pins 50 are relatively soft compared to the steel of the ring 24, the engagement between the braking ring 40 and the mounting ring 24 provides a controlled brake to the shaft 16, preventing it from rotating further.

Once the hoist or winch 12 is in a safe configuration, and the braking assembly 10 can be released, rotation of the braking ring 40 in an opposite direction by rotating the shaft 16 will cause the head portions 160 of the pins 140 and 142 to be release from the angled edges 178 and 180 and contact an angled edge 200 and 202 of the braking stops 58 and 60, respectively, once the braking ring 40 has rotated one complete revolution. The shape of the head portion 160 and the orientation of the angled edges 200 and 202 pushes the pins 140 and 142 back into the insert 70 to reset the brake assembly 10. The pins 50 can then be replaced with new pins, and the assembly 10 will be operational again.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A braking assembly comprising:
   a mounting ring operable to be mounted to a machine;
   a braking ring threadably mounted to the mounting ring;
   first and second braking stops mounted to an inside surface of the braking ring;
   a braking insert operable to be mounted to a shaft coupled to the machine, said braking insert including a center cylinder through which the shaft extends and a chamber provided between an outer wall of the insert and the center cylinder;
   first and second opposing weights positioned within the chamber in the braking insert;
   a first braking pin rigidly mounted to the first weight and a second braking pin rigidly mounted to the second weight, said first braking pin passing through a bore in the first weight, a bore in the center cylinder and a bore in the outer wall of the insert, and said second braking pin passing through a bore in the second weight, a bore in the center cylinder and a bore in the outer wall of the insert; and
   a calibration device mounted to the insert and coupled to the first braking pin, said calibration device holding the first weight in a retracted position until the speed of the shaft causes the calibration device to release the first weight, which causes the first and second weights to slide under centrifugal force so as to extend the first and second braking pins beyond the outer wall of the insert and engage the first and second braking stops to cause the braking ring to rotate on the mounting ring and stop the rotation of the shaft.

2. The braking assembly according to claim 1 wherein the braking ring includes a plurality of stopping pins that engage the mounting ring and cause the braking ring to stop rotating as the stopping pins are driven into the mounting ring.

3. The braking assembly according to claim 2 wherein the stopping pins are made of a softer metal than the mounting ring.

4. The braking assembly according to claim 2 wherein the plurality of stopping pins are disposed around an outer flange of the braking ring.

5. The braking assembly according to claim 1 further comprising first and second locking rings each including first and second slots, wherein the first locking ring is coupled to first and second locking pins mounted to one end of the first and second weights and the second locking ring is coupled to third and fourth locking pins mounted to an opposite end of the first and second weights wherein the locking pins are movable in the slots so that the first and second weights move together between the retracted and extended position.

6. The braking assembly according to claim 1 wherein the calibration device includes a ball positioned within a groove of the first braking pin, and held in place under tension by a calibration spring.

7. The braking assembly according to claim 1 wherein the first and second braking pins include a body portion and a rounded head portion providing a groove therebetween and the first and second braking stops include an angled edge at one end, and wherein the angled edge of the braking stops becomes positioned within the groove between the body portion and the head portion of the braking pins when the braking pins are extended to cause the braking ring to rotate with the insert.

8. The braking assembly according to claim 7 wherein the first and second braking stops include a ramped edge opposite to the angled edge that cause the braking pins to move the first and second weights back to the retracted position when the shaft is rotated in an opposite direction.

9. The braking assembly according to claim 1 wherein the first and second weights are half cylindrical weights where the first and second weights extend around the center cylinder of the insert when the first and second weights are in the retracted position and separate and contact the outer wall of the insert when the first and second weights are in the extended position.

10. The braking assembly according to claim 1 wherein the machine is an overhead hoist or winch and the shaft is coupled to a cable drum on the machine.

11. A braking assembly comprising:
    a mounting ring operable to be mounted to a machine;
    a braking ring threadably mounted to the mounting ring, said braking ring including a plurality of stopping pins that engage the mounting ring and cause the braking ring to stop rotating as the stopping pins are driven into the mounting ring;
    a braking insert operable to be mounted to a shaft coupled to the machine;
    a plurality of weights positioned within a chamber in the braking insert, wherein the plurality of weights are held in a retracted position if the speed of rotation of the insert is below a calibrated speed and the plurality of weights move outward within the chamber if the speed of the insert exceeds the calibrated speed which causes the weights to engage the braking ring which causes the braking ring to rotate on the mounting ring and stop the rotation of the shaft; and
    braking stops mounted to an inside surface of the braking ring, a first braking pin rigidly mounted to a first one of the plurality of weights and a second braking pin rigidly mounted to a second one of the plurality of weights, wherein the braking pins extend out of the insert and engage the braking stops when the weights move outward in the chamber, wherein the first braking pin passes through a bore in a center cylinder of the insert and a bore in an outer wall of the insert, and the second braking pin passes through a bore in the center cylinder of the insert and a bore in the outer wall of the insert.

12. The braking assembly according to claim 11 wherein the stopping pins are made of a softer metal than the mounting ring.

13. The braking assembly according to claim 11 wherein the plurality of stopping pins are disposed around an outer flange of the braking ring.

14. The braking assembly according to claim 11 wherein the insert includes a center cylinder through which the shaft extends and wherein the chamber in the insert is provided between an outer wall of the insert and the center cylinder.

15. The braking assembly according to claim 14 wherein the plurality of weights are first and second weights that are half-cylindrical weights where the first and second weights extend around the center cylinder when the first and second weights are in the retracted position and separate and contact the outer wall of the insert when the first and second weights are in the extended position.

16. A braking assembly comprising:
a mounting ring operable to be mounted to a machine;
a braking ring threadably mounted to the mounting ring, said braking ring including a plurality of stopping pins that engage the mounting ring;
first and second braking stops mounted to an inside surface of the braking ring, said first and second braking stops include an angled edge at one end;
a braking insert operable to be mounted to a shaft coupled to the machine, said braking insert including a center cylinder through which the shaft extends and a chamber provided between an outer wall of the insert and the center cylinder;
first and second opposing weights positioned within the chamber in the braking insert, said first and second weights being half-cylindrical weights where the first and second weights extend around the center cylinder of the insert when the first and second weights are in a retracted position and separate and contact the outer wall of the insert when the first and second weights are in an extended position;
a first braking pin rigidly mounted to the first weight and a second braking pin rigidly mounted to the second weight, said first and second braking pins including a body portion and a rounded head portion providing a groove therebetween, said first braking pin passing through a bore in the first weight, a bore in the center cylinder and a bore in the outer wall of the insert, and said second braking pin passing through a bore in the second weight, a bore in the center cylinder and a bore in the outer wall of the insert;
first and second locking rings each including first and second slots, wherein the first locking ring is coupled to first and second locking pins mounted to one end of the first and second weights and the second locking ring is coupled to third and fourth locking pins mounted to an opposite end of the first and second weights wherein the locking pins are movable in the slots so that the first and second weights move together between the retracted position and the extended position; and
a calibration device mounted to the insert and coupled to the first braking pin, said calibration device holding the first weight in the retracted position until the speed of the shaft causes the calibration device to release the first weight, which causes the first and second weights to slide under centrifugal force to the extended position so as to extend the first and second braking pins beyond the outer wall of the insert and engage the first and second braking stops so that the angled edge of the braking stops becomes positioned within the groove between the body portion and the head portion of the braking pins to cause the braking ring to rotate on the mounting ring and cause the braking ring to stop rotating as the stopping pins are driven into the mounting ring.

17. The braking assembly according to claim 16 wherein the stopping pins are made of a softer metal than the mounting ring.

18. The braking assembly according to claim 16 wherein the calibration device includes a ball positioned within a groove of the first braking pin, and held in place under tension by a calibration spring.

19. The braking assembly according to claim 16 wherein the first and second braking stops include a ramped edge opposite to the angled edge that cause the braking pins to move the first and second weights back to the retracted position when the shaft is rotated in an opposite direction.

* * * * *